Jan. 30, 1934.　　　　C. HARWOOD　　　　1,944,933
AUTOMOBILE BUMPER SHIELD
Filed Aug. 15, 1933
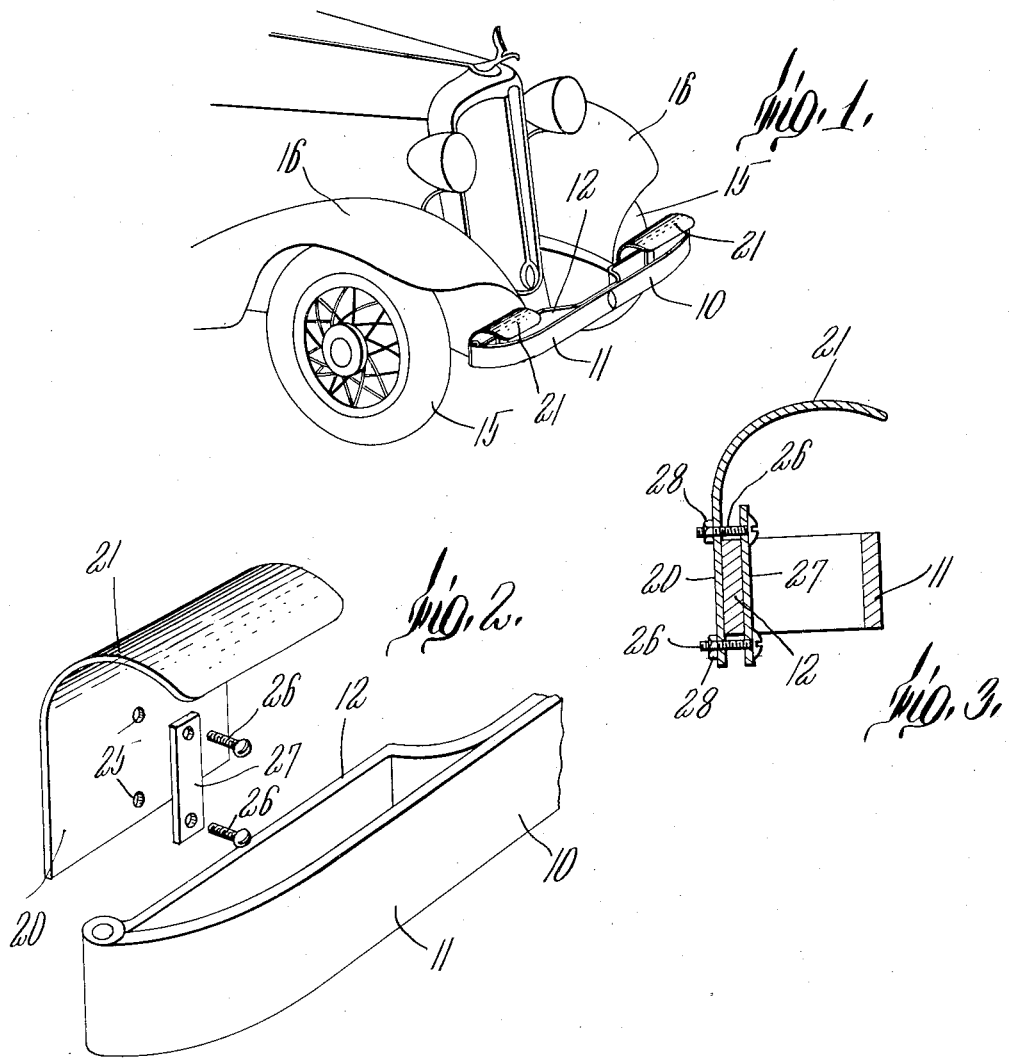
Inventor
Clark Harwood
by Wright, Brown, Quinby & May
Attys Patented Jan. 30, 1934

1,944,933

UNITED STATES PATENT OFFICE 1,944,933

AUTOMOBILE BUMPER SHIELD

Clark Harwood, Auburndale, Mass.

Application August 15, 1933. Serial No. 685,205

6 Claims. (Cl. 293—55)

This invention relates to a shield for protecting the end portions of front bumpers on automobiles. The use of yielding bumpers extending across the entire front of automobiles is almost universal. The end portions of such bumpers, however, tend to accumulate deposits of gravel, road oil, mud, etc. thrown off the treads of the front tires when the vehicle is in motion, the end portions of the bumpers being usually in line with the front wheels of the vehicle. The bumpers themselves are customarily plated with some bright metal and are thus not only useful but also ornamental, adding considerably to the attractive appearance of the car. Such accumulations of mud, road oil and gravel are undesirable and unsightly. In order to protect the bumper, a boot of some kind, such as a short section of an inner tube is often slipped over each end portion thereof. These protective devices, however, are more unsightly than the mud-deposit themselves, and hide portions of the bumper from view.

It is an object of the present invention to provide a shield which will not conceal the end portions of the bumper but will protect them from mud and other material thrown from the treads of the tires, the shield itself being attractive in appearance, relatively inconspicuous, easily removable, and easily cleaned.

For a more complete understanding of the invention, reference may be had to a disclosure of an embodiment thereof in the description which follows, and to the drawing of which Figure 1 is a perspective view of the forward end portion of an automobile, showing a bumper with a pair of shields thereon embodying the invention.

Figure 2 is a perspective view of an end portion of a bumper and a shield adapted to be attached thereto.

Figure 3 is a sectional view of a bumper with a shield thereon.

A conventional form of automobile bumper is illustrated at 10 in Figure 1. The end portions of such a bumper frequently include a forward member 11 and a rear member 12. These end portions are usually in line with the front wheels 15 of the vehicle so that particles of mud, gravel, oil, etc., picked up by the treads of the tires and thrown therefrom by centrifugal force, are apt to impinge upon and stick to the under face of the mud guards 16 and also on the end portions of the bumper 10. In order to protect these end portions from such accumulations, I provide a shield of substantial rigidity sufficient to retain its shape in spite of whatever wind pressure it may be subjected to by reason of the motion of the vehicle. The shield may be of any suitable material or materials, such as metal, celluloid, phenolic condensation products, paper felt saturated with asphalt or the like, or any other desirable material. The shield may be cast or molded, or may be bent to shape from flat sheet form. For example, I may cut a suitable blank from a sheet of metal such as aluminum and may bend a portion thereof into a desirable shape as illustrated in Figure 2, the shield having an upstanding portion 20 and a forwardly curving portion 21. The upstanding portion 20 is adapted to be secured against the rear face of the rear member 12 of the bumper 10, the bent or curved portion 21 being adapted to extend forwardly over the end portion of the bumper, as indicated in Figure 3, the extreme edge of the portion 21 preferably projecting slightly beyond the front member 11 of the bumper. It is evident that the shield thus protects the end portion of the bumper from dirt, etc. thrown from the tire tread, but it does not conceal the bumper. Any convenient or suitable means may be employed for detachably securing the shield to the bumper. As shown by way of example, the upstanding portion 20 of the shield may be provided with a pair of holes 25. A pair of screws 26 are provided to project through a clamping plate 27 above and below the edges of the bumper member 12, these screws projecting through the holes 25 respectively, as shown in Figure 3. A pair of nuts 28 may be screwed onto the screws 26 and set up against the rear face of the shield so as to clamp the same tightly against the member 12. Thus the shield may be readily cleaned while in place, or may be easily detached. Instead of metal shields, I may provide shields of some inexpensive material such as paper felt impregnated with waterproof stiffening material, shields of this kind being adapted for use until they have accumulated mud, etc., and then thrown away and replaced by new shields.

It is evident that various modifications and changes may be made in the embodiment of the invention herein shown and described without departing from the spirit or scope of the invention as defined in the following claims.

I claim:

1. An automobile bumper shield comprising a piece of upstanding sheet material adapted to be secured to the rear face of a portion of an automobile bumper, said shield having an upper portion projecting forwardly so as to extend above and beyond the forward face of a bumper on which it is mounted.

2. An automobile bumper shield comprising a member having an upstanding portion and a forwardly projecting portion, and means for securing said upstanding portion against the rear face of an end portion of an automobile bumper, said forwardly projecting portion being of a size and shape to overhang and extend beyond a substantial portion of a bumper on which said shield is mounted.

3. An automobile bumper shield comprising a sheet of substantial rigidity having an upstanding lower portion and a forwardly bent upper portion, and means for securing said lower portion against the rear face of an end portion of a bumper, said upper portion being shaped to extend forwardly above the end portion of a bumper to which the shield is attached.

4. An automobile bumper shield comprising a shape-retaining member of sheet material, said member having an upstanding portion and a forwardly arched upper portion adapted to overhang a portion of a bumper, and means for detachably securing said member against the rear face of said bumper.

5. In combination with an automobile bumper, a shield therefor comprising a sheet of substantial rigidity secured to the rear face of said bumper near an end thereof, said shield having a portion rising above said bumper and extending forwardly thereover.

6. In combination, an automobile bumper, a shield for an end portion of said bumper, and means detachably securing said shield against a portion of the rear face of said bumper, said shield having a substantially rigid portion extending above and forwardly over a portion of said bumper.

CLARK HARWOOD.